(12) United States Patent
Eom et al.

(10) Patent No.: US 11,075,389 B2
(45) Date of Patent: Jul. 27, 2021

(54) ELECTRODE FOR RECHARGEABLE LITHIUM BATTERY, AND RECHARGEABLE LITHIUM BATTERY INCLUDING SAME

(71) Applicant: Samsung SDI Co., Ltd., Yongin-si (KR)

(72) Inventors: Hyeri Eom, Yongin-si (KR); Seungjae Lee, Yongin-si (KR); Da-Un Han, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 197 days.

(21) Appl. No.: 16/142,621

(22) Filed: Sep. 26, 2018

(65) Prior Publication Data

US 2019/0140286 A1   May 9, 2019

(30) Foreign Application Priority Data

Nov. 7, 2017 (KR) .................. 10-2017-0147472

(51) Int. Cl.
| | | |
|---|---|---|
| *H01M 4/80* | (2006.01) | |
| *H01M 4/133* | (2010.01) | |
| *H01M 4/134* | (2010.01) | |
| *H01M 4/38* | (2006.01) | |
| *H01M 4/587* | (2010.01) | |
| *H01M 4/66* | (2006.01) | |

(Continued)

(52) U.S. Cl.
CPC .......... *H01M 4/808* (2013.01); *H01M 4/133* (2013.01); *H01M 4/134* (2013.01); *H01M 4/386* (2013.01); *H01M 4/387* (2013.01); *H01M 4/587* (2013.01); *H01M 4/661* (2013.01); *H01M 10/0525* (2013.01); *H01M 2004/027* (2013.01)

(58) Field of Classification Search
None
See application file for complete search history.

(56) References Cited

U.S. PATENT DOCUMENTS

| | | | | |
|---|---|---|---|---|
| 4,251,603 A | * | 2/1981 | Matsumoto | ............. H01M 4/32 29/623.5 |
| 6,902,846 B2 | * | 6/2005 | Hayashi | .................. H01M 4/30 429/206 |
| 9,564,656 B1 | * | 2/2017 | Zhamu | .................. H01M 4/808 |

(Continued)

FOREIGN PATENT DOCUMENTS

| | | |
|---|---|---|
| KR | 10-2012-0111508 A | 10/2012 |
| KR | 10-2013-0025525 A | 3/2013 |
| KR | 10-2013-0101375 A | 9/2013 |

OTHER PUBLICATIONS

Components of Cells and Batteries, accessed at https://depts.washington.edu/matseed/batteries/MSE/components.html (date unknown). (Year: 2020).*

*Primary Examiner* — Amanda J Barrow
(74) *Attorney, Agent, or Firm* — Lee IP Law, PC

(57) ABSTRACT

A rechargeable lithium battery includes a metal-containing foam current collector, and an active mass that fills in the metal-containing foam current collector, the active mass including an active material. The electrode includes a central region and a surface region. The central region corresponds to a ±5% upper and lower area with a reference to a central thickness line of the electrode. A volume ratio of the metal and the active material in the central region is different from a volume ratio of the metal and the active material in the surface region.

7 Claims, 4 Drawing Sheets

(51) Int. Cl.
*H01M 10/0525* (2010.01)
*H01M 4/02* (2006.01)

(56) References Cited

U.S. PATENT DOCUMENTS

| | | | | |
|---|---|---|---|---|
| 2013/0252092 A1* | 9/2013 | Huang | ............ | H01M 4/762 |
| | | | | 429/211 |
| 2014/0186701 A1* | 7/2014 | Zhang | ............ | H01M 4/624 |
| | | | | 429/211 |
| 2016/0079626 A1* | 3/2016 | Bae | ........ | H01M 4/362 |
| | | | | 429/200 |
| 2019/0288295 A1* | 9/2019 | Joo | ........ | H01M 4/667 |
| 2019/0305306 A1* | 10/2019 | Sato | ........ | H01M 4/131 |

* cited by examiner

ELECTRODE FOR RECHARGEABLE LITHIUM BATTERY, AND RECHARGEABLE LITHIUM BATTERY INCLUDING SAME

CROSS-REFERENCE TO RELATED APPLICATION

Korean Patent Application No. 10-2017-0147472 filed on Nov. 7, 2017, in the Korean Intellectual Property Office, and entitled: "Electrode for Rechargeable Lithium Battery, and Rechargeable Lithium Battery Including Same," is incorporated by reference herein in its entirety.

BACKGROUND

1. Field

Embodiments relate to an electrode for a rechargeable lithium battery and a rechargeable lithium battery including the same.

1. Description of the Related Art

A rechargeable lithium battery has recently drawn attention as a power source for small portable electronic devices. The rechargeable lithium battery uses an organic electrolyte solution and thereby may have a discharge voltage that is twice or more higher than a conventional battery using an alkali aqueous solution and accordingly, may have a higher energy density.

As for a positive active material of a rechargeable lithium battery, a lithium-transition metal oxide having a structure capable of intercalating lithium ions such as $LiCoO_2$, $LiMn_2O_4$, $LiNi_{1-x}Co_xO_2$ (0<x<1), and the like has been used.

As for negative active materials, various carbon-based materials such as artificial graphite, natural graphite, hard carbon and the like have been used. Recently, a non-carbon-based negative active material based on silicon or tin has been researched in order to obtain more higher capacity.

SUMMARY

Embodiments are directed to an electrode for a rechargeable lithium battery, including a metal-containing foam current collector, and an active mass that fills in the metal-containing foam current collector, the active mass including an active material. The electrode includes a central region and a surface region. The central region corresponds to a ±5% upper and lower area with a reference to a central thickness line of the electrode. A volume ratio of the metal and the active material in the central region is different from a volume ratio of the metal and the active material in the surface region.

The volume ratio of the metal and the active material in the central region may range from about 90:10 to less than 100:greater than 0.

The volume ratio of the metal and the active material in the surface region may range from about 5:95 to about 20:80.

The active material may be present with a concentration gradient such that a concentration increases from the central region to the surface region.

The surface region may include an outermost surface region corresponding to a depth of about 10% from the outermost surface in a direction contacting the central region. In the outermost surface region, the volume ratio of the metal and the active material may range from about 10:90 to about 1:99.

The active material may be present at uniform concentration in the surface region.

The electrode further may further include an active mass layer on the surface region. The active mass layer may include an active material.

The electrode may be a negative electrode.

The metal-containing foam current collector may be a Cu-containing foam current collector.

The active material may be a Si-based material, a Sn-based material, or a combination thereof.

Embodiments are also directed to a rechargeable lithium battery including a first electrode, wherein the first electrode is the electrode as described above, a second electrode, and an electrolyte.

The first electrode may be a negative electrode and the second electrode may be a positive electrode.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
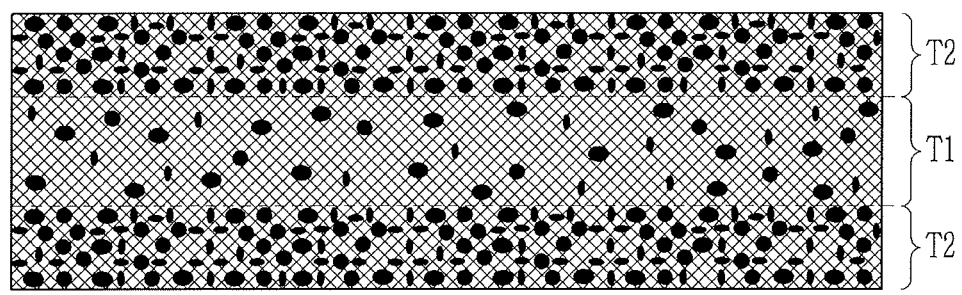
FIG. 1 illustrates a schematic cross-sectional view showing a structure of an electrode according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

An electrode for a rechargeable lithium battery according to an embodiment may include a metal-containing foam current collector and an active mass including an active material filling the metal-containing foam current collector, wherein the electrode includes a central region and a surface region.

The foam current collector may be a current collector having a three-dimensional reticular structure including a metal fiber.

Figure 2:
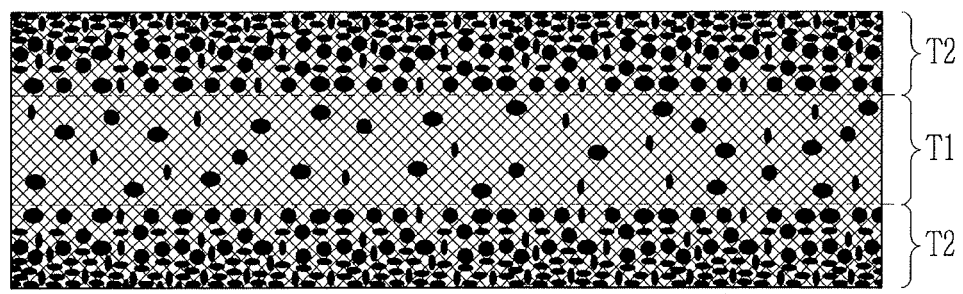
FIG. 2 illustrates a schematic cross-sectional view showing a structure of an electrode according to an embodiment.

In an embodiment, the central region and the surface region may respectively correspond to areas T1 and T2 shown in FIGS. 1 and 2. For example, the central region may correspond to +5% upper and lower areas with a reference to a central thickness line of the electrode. For example, the central region may be the middle 10% in a thickness direction of the electrode (i.e., 5% of the thickness in each direction from the central thickness line), relative to a total thickness of the electrode. In FIGS. 1 and 2, dots indicate active materials.

In an embodiment, the volume ratio of the metal and the active material may be about 90:10 to less than 100:greater than 0 in the central region. For example, the volume ratio of the metal and the active material may be about 90:10 to about 95:5 in the central region.

This volume ratio may be obtained by preparing a cross section specimen of the electrode, mapping the active material and the metal with an SEM-EDX instrument to obtain areas of the active material and the metal, and using the areas to calculate a ratio of the active material and the metal. Metal fibers may be substantially uniformly formed in the foam current collector, such that the ratio of the metal/the active material from the cross section may be assumed as an entire volume ratio.

When the volume ratio of the metal and the active material is included within the ranges in the central region, the amount of metal may be sufficient to prevent the metal fibers from being broken by an active material during the compression of an electrode. Accordingly, a conductive path for fast transferring of a current may be secured. An electrode having excellent charge rate capability and excellent electron conductivity may be obtained. When the volume ratio is out of the range, that is, less than about 90, the charge rate capability may be deteriorated, the current transfer capability may be gradually deteriorated as cycles are repeated, even though a charge rate (C-rate) is not much increased, and accordingly, a cycle-life degradation speed may be accelerated due to an occurrence of a side-reaction or the like.

In addition, when the volume ratio of the metal and the active material in the central region is included within the ranges, that is, the active material is less than the metal, even though the active material may be volume-expanded, the current collector having a three-dimensional reticular structure may absorb the volume expansion and ultimately prevent the electrode from being volume-expanded. Accordingly, the electrode according to an embodiment may be the most effectively applied to an electrode using a Si-based or Sn-based negative active material that is generally severely volume-expanded during the charge and discharge.

In the surface region, the volume ratio of the metal and the active material may be about 5:95 to about 20:80, or, for example, about 10:90 to about 20:80, or, for example about 10:90 to about 15:85.

In an embodiment, the active material may be constantly, or, for example, uniformly present in the surface region as shown in FIG. 1.

In an embodiment, the active material may be present with a concentration gradient in which a concentration of the active material increases from the central region to the surface region, as shown in FIG. 2. In addition, the surface region may include an outermost surface region corresponding to a depth of about 10% from the outermost surface in a direction contacting the central region. In the outermost surface region, a volume ratio of the metal and the active material may range from about 10:90 to about 1:99.

According to an embodiment, the active material may be present at a uniform concentration in the surface region.

When the electrode according to an embodiment has different volumes of the active material in the central region and the surface region of the foam current collector, for example, when the metal is present in a higher volume in the central region, metal fibers may not be broken but may be well maintained during compression in an electrode manufacturing process. Accordingly, the capacity as well as the battery performance may be effectively maintained. In addition, when the metal is present in a higher volume in the central region, and the foam current collector may transfer a current as fast as does a foil-shaped current collector not charged with an active material inside a central region. Accordingly, excellent output characteristics may be obtained. If the active material were to be present in the same volume in both the central region and the surface region of the foam current collector or in a higher volume in the central region, metal fibers could broken by the active material during the compression in the manufacture of the electrode, and a conductive path could be short-circuited. Accordingly, battery performance or battery capacity could be deteriorated, and resultantly, output characteristics could be deteriorated.

The active mass may further include a binder along with the active material, and, optionally, a conductive material.

The electrode may further include an active mass layer formed on the surface part and including an active material The active mass layer may further include a binder along with the active material, and optionally a conductive material.

In an embodiment, the electrode may be manufactured by coating an active mass composition including an active material, a binder, a conductive material, and a solvent and having viscosity of about 1500 cP to about 3000 cP onto the metal-containing foam current collector and compressing the active mass composition.

When the active mass composition has a viscosity within the range, the active mass composition may have a high viscosity that inhibits permeating into the central region of the current collector. Accordingly, the active mass composition may be mostly present in the surface region, while permeated in a small amount into the central region. When a finally manufactured electrode is examined, the surface region of the current collector may be highly charged with the active material, but the central region may be charged with at most about 10 volume % of the active material and thus with at least about 90 volume % of a metal.

When the active mass composition having the viscosity is once coated, an electrode having the active material uniformly present in the surface region may be manufactured as shown in FIG. 1.

If the active mass composition were to have a lower viscosity than about 1500 cP, the active mass composition could permeate easily into the central region of the current collector and to be almost equally present in the central region and the surface region. Accordingly, metal fibers could be broken by the active material after compression, and resultantly, there could be a decrease of battery performance due to a conductive path short circuit, a decrease in battery capacity, and a deterioration of output characteristics.

On the other hand, if the active mass composition were to have a viscosity higher than about 3000 cP, the active material may be permeated in an appropriate level into the surface region of the foam type current collector, but might not be easily permeated among pores in the central region to fabricate an electrode. Accordingly, the electrode may be difficult to manufacture.

In another embodiment, the electrode may be manufactured by primarily coating an active mass composition including an active material, a binder, a conductive material, and a solvent and having high viscosity of about 2500 cP to about 3000 cP onto the metal-containing foam current collector and compressing the active mass composition, and then, secondarily coating another active mass composition having low viscosity of about 1500 cP to about 2500 cP and compressing the secondary coating.

In this way, when active mass compositions having different viscosities are used, the active material may be present with a concentration gradient in which a concentration of the active material increases from the central region to the surface region, as shown in FIG. 2.

The compression may be performed with a pressure of about 150 kg/cm$^2$ to about 250 kg/cm$^2$. When the compression is within the range, the electrode compression may be effectively performed. If the compression were to be performed with a lower pressure than the range, the electrode might not be well compressed. If the compression were to be performed with a higher pressure than the range, the electrode could be severely pushed down. If the active material were to be pushed down, metal fibers surrounding the active material could be broken, and thus a conductive path could be broken.

The coating method may be blade coating.

The solvent may be N-methylpyrrolidone or water. The solvent may be appropriately selected therefrom depending on whether the binder is a non-aqueous binder or an aqueous binder.

In an embodiment, the electrode may be a positive electrode or a negative electrode. In another embodiment, the electrode may be a negative electrode.

When the electrode is a positive electrode, the current collector may be an Al-containing foam current collector, for example, a foam current collector made of Al. When the electrode is a negative electrode, the current collector may be a Cu-containing foam current collector, for example, a foam current collector made of Cu.

When the electrode is a positive electrode, the active material may be a positive active material. The positive active material may include a compound (lithiated intercalation compound) being capable of intercalating and deintercalating lithium. For example, one or more composite oxides of a metal selected from cobalt, manganese, nickel, and a combination thereof, and lithium may be used. More specific examples may be compounds represented by one of the following chemical formulae. $Li_aA_{1-b}X_bD_2$ ($0.90 \leq a \leq 1.8$, $0 \leq b \leq 0.5$); $Li_aA_{1-b}X_bO_{2-c}D_c$ ($0.90 \leq a \leq 1.8$, $0 \leq b \leq 0.5$, $0 \leq c \leq 0.05$); $Li_aE_{1-b}X_bO_{2-c}D_c$ ($0.90 \leq a \leq 1.8$, $0 \leq b \leq 0.5$, $0 \leq c \leq 0.05$); $Li_aE_{2-b}X_bO_{4-c}D_c$ ($0.90 \leq a \leq 1.8$, $0 \leq b \leq 0.5$, $0 \leq c \leq 0.05$); $Li_aNi_{1-b-c}Co_bX_cD_\alpha$ ($0.90 \leq a \leq 1.8$, $0 \leq b \leq 0.5$, $0 \leq c \leq 0.5$, $0 \leq \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, $0 \leq \alpha \leq 2$); $Li_aNi_{1-b-c}Co_bX_cO_{2-\alpha}T_2$ ($0.90 \leq a \leq 1.8$, $0 \leq b \leq 0.5$, $0 \leq c \leq 0.05$, $0 \leq \alpha \leq 2$); $Li_aNi_{1-b-c}Mn_bX_cD_\alpha$ ($0.90 \leq a \leq 1.8$, $0 \leq b \leq 0.5$, $0 \leq c \leq 0.05$, $0 \leq \alpha \leq 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 \leq \alpha < 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.05$, $0 \leq \alpha < 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$) $Li_aCoG_bO_2$ ($0.90 \leq a \leq 1.8$, $0.001 \leq b \leq 0.1$); $Li_aMn_{1-b}G_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $Li_aMn_{1-g}G_gPO_4$ ($0.90 \leq a \leq 1.8$, $0 \leq g \leq 0.5$); $QO_2$; $QS_2$; $LiQS_2$; $V_2O_5$; $LiV_2O_5$; $LiZO_2$; $LiNiVO_4$; $Li_{(3-f)}J_2PO_{43}$ ($0 \leq f \leq 2$); $Li_{(3-f)}Fe_2PO_{43}$ ($0 \leq f \leq 2$); and $Li_aFePO_4$ ($0.90 \leq a \leq 1.8$)

In the chemical formulae, A is selected from Ni, Co, Mn, and a combination thereof; X is selected from Al, Ni, Co, Mn, Cr, Fe, Mg. Sr, V, a rare earth element, and a combination thereof; D is selected from O, F, S, P, and a combination thereof; E is selected from Co, Mn, and a combination thereof, T is selected from F, S, P, and a combination thereof; G is selected from Al, Cr, Mn, Fe. Mg, La, Ce, Sr, V, and a combination thereof; Q is selected from Ti, Mo. Mn, and a combination thereof; Z is selected from Cr, V, Fe, Sc, Y, and a combination thereof; and J is selected from V, Cr, Mn, Co, Ni, Cu, and a combination thereof.

The compounds may have a coating layer on the surface thereof, or may be mixed with another compound having a coating layer. The coating layer may include at least one coating element compound selected from an oxide of a coating element, a hydroxide of a coating element, an oxyhydroxide of a coating element, an oxycarbonate of a coating element, and a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed using a method that has no adverse influence on properties of a positive active material, by using these elements in the compound. For example, the method may include a suitable coating method such as spray coating, dipping, or the like.

When the electrode is a negative electrode, the active material may be a negative active material. The negative active material may be a material that reversibly intercalates/deintercalates lithium ions, a lithium metal, a lithium metal alloy, a material being capable of doping/dedoping lithium, or a transition metal oxide.

The material that can reversibly intercalate/deintercalate lithium ions may be or include a carbon material. The carbon material may be any generally-used carbon-based negative active material in a rechargeable lithium battery. Examples of the carbon-based negative active material may include crystalline carbon, amorphous carbon, or mixtures thereof. The crystalline carbon may be non-shaped, or sheet, flake, spherical, or fiber shaped natural graphite or artificial graphite. The amorphous carbon may be a soft carbon, a hard carbon, a mesophase pitch carbonization product, fired coke, and the like.

The lithium metal alloy may include an alloy of lithium and a metal selected from Na, K, Rb, Cs, Fr, Be, Mg, Ca, Sr, Si, Sb, Pb, In, Zn, Ba, Ra, Ge, Al, and Sn.

The material being capable of doping/dedoping lithium may be a silicon-based material, for example, Si, $SiO_x$ ($0 < x < 2$), a Si-Q' alloy (wherein Q' is an element selected from an alkali metal, an alkaline-earth metal, a Group 13 element, a Group 14 element, a Group 15 element, a Group 16 element, a transition metal, a rare earth element, and a combination thereof, but not Si), a Si-carbon composite, Sn, $SnO_2$, Sn—R (wherein R is an element selected from an alkali metal, an alkaline-earth metal, a Group 13 element, a Group 14 element, a Group 15 element, a Group 16 element, a transition metal, a rare earth element, and a combination thereof, but not Sn), a Sn-carbon composite, and the like. At least one of these materials may be mixed with $SiO_2$. The elements Q' and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, and a combination thereof.

The transition metal oxide may include lithium titanium oxide.

According to an embodiment, the negative active material may be a Si-based active material, a Sn-based active material, or a combination thereof. When the negative active material is the Si-based active material, the Sn-based active material, or the combination thereof, the negative active material may have an excessive volume expansion during the charge and discharge, but a negative electrode according to an embodiment may effectively absorb an expanded volume of the active material and resultantly, the negative active material may be prevented from the volume expansion, since the active material is less present in the central region having a three-dimensional reticular structure.

Hereinafter, a constitution of the active material layer is illustrated, depending on a positive electrode and a negative electrode.

When the electrode is a positive electrode, the active mass may include a positive active material, a binder, and a conductive material. The content of the positive active material may be about 90 wt % to about 98 wt % based on the total weight of the active mass. In addition, each content of the binder and conductive material may be about 1 wt % to about 5 wt % based on the total weight of the active mass. These contents are the same as those of the positive active material, the binder, and the conductive material in an active mass composition except for the solvent during manufacture of the electrode.

The binder may improve binding properties of positive active material particles with one another and with a current collector. Examples of the binder may be polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like.

The conductive material may be included to provide electrode conductivity. A suitable electrically conductive material that does not cause a chemical change may be used as the conductive material. Examples of the conductive material may be or include a carbon-based material such as natural graphite, artificial graphite, carbon black, acetylene black, ketjen black, a carbon fiber, or the like; a metal-based material of a metal powder or a metal fiber including copper, nickel, aluminum silver, or the like; a conductive polymer such as a polyphenylene derivative, or the like, or a mixture thereof.

When the electrode is a negative electrode, the active mass may include a negative active material, a binder, and, optionally, a conductive material. The content of the negative active material may be about 95 wt % to about 99 wt % based on the total weight of the active mass. In addition, the content of the binder in the active mass may be about 1 wt % to about 5 wt % based on the total weight of the active mass. In addition, when the negative electrode further includes the conductive material, the negative electrode may include about 90 wt % to about 98 wt % of the negative active material, about 1 wt % to about 5 wt % of the binder, and about 1 wt % to about 5 wt % of the conductive material. These amounts are the same as those of the negative active material, the binder, and the conductive material in an active mass composition except for the solvent during manufacture of the electrode.

The binder may improve binding properties of negative active material particles with one another and with a current collector. The binder may include a non-water-soluble binder, a water-soluble binder, or a combination thereof.

The non-water-soluble binder may be polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide or a combination thereof.

The water-soluble binder may be a styrene-butadiene rubber, an acrylated styrene-butadiene rubber (SBR), an acrylonitrile-butadiene rubber, an acrylic rubber, a butyl rubber, a fluorine rubber, an ethylene propylene copolymer, polyepichlorohydrine, polyphosphazene, polyacrylonitrile, polystyrene, an ethylene propylene diene copolymer, polyvinylpyridine, chlorosulfonated polyethylene, latex, a polyester resin, an acrylic resin, a phenolic resin, an epoxy resin, polyvinyl alcohol, or a combination thereof.

When the water-soluble binder is used as a negative electrode binder, a cellulose-based compound may be further used to provide viscosity as a thickener. The cellulose-based compound includes one or more of carboxymethyl cellulose, hydroxypropylmethyl cellulose, methyl cellulose, or alkali metal salts thereof. The alkali metal may be Na, K, or Li. The thickener may be included in an amount of about 0.1 parts by weight to about 3 parts by weight based on 100 parts by weight of the negative active material.

The conductive material may be included to provide electrode conductivity. A suitable electrically conductive material that does not cause a chemical change may be used as the conductive material. Examples of the conductive material may include a carbon-based material such as natural graphite, artificial graphite, carbon black, acetylene black, ketjen black, a carbon fiber, or the like; a metal-based material of a metal powder or a metal fiber including copper, nickel, aluminum silver, or the like; a conductive polymer such as a polyphenylene derivative, or the like, or a mixture thereof.

A rechargeable lithium battery according to another embodiment may include a first electrode, a second electrode, and an electrolyte. The first electrode may be a negative electrode and the second electrode may be a positive electrode or the first electrode may be a positive electrode and the second electrode may be a negative electrode. For example, in an embodiment, the first electrode is a negative electrode and the second electrode is a positive electrode.

The electrolyte may include a non-aqueous organic solvent and a lithium salt.

The non-aqueous organic solvent may serve as a medium for transmitting ions taking part in the electrochemical reaction of a battery.

The non-aqueous organic solvent may serve as a medium for transmitting ions taking part in the electrochemical reaction of a battery.

The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester-based solvent may include methyl acetate, ethyl acetate, n-propyl acetate, dimethylacetate, methyl propionate, ethyl propionate, propyl propionate, decanolide, mevalonolactone, caprolactone, or the like. The ether-based solvent may include dibutyl ether, tetraglyme, diglyme, dimethoxyethane, 2-methyltetrahydrofuran, tetrahydrofuran, or the like. The ketone-based solvent includes cyclohexanone, or the like. The alcohol-based solvent may include ethyl alcohol, isopropyl alcohol, or the like. Examples of the aprotic solvent may include nitriles such as R—CN (where R is a C2 to C20 linear, branched, or cyclic hydrocarbon or may include, a double bond, an aromatic ring, or an ether bond), amides such as dimethylformamide, dioxolanes such as 1,3-dioxolane, sulfolanes, or the like.

The organic solvent may be used singularly or in a mixture. When the organic solvent is used in a mixture, the mixture ratio may be controlled in accordance with a desirable battery performance.

The carbonate-based solvent may include a mixture with a cyclic carbonate and a linear carbonate. The cyclic carbonate and linear carbonate may be mixed together in a volume ratio of about 1:1 to about 1:9. When the mixture is used as an electrolyte, the electrolyte may have enhanced performance.

The organic solvent may further include an aromatic hydrocarbon-based solvent as well as the carbonate-based solvent. The carbonate-based solvent and aromatic hydrocarbon-based solvent may be mixed together in a volume ratio of about 1:1 to about 30:1.

The aromatic hydrocarbon-based organic solvent may be an aromatic hydrocarbon-based compound represented by Chemical Formula 1.

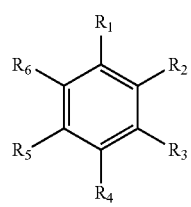

[Chemical Formula 1]

In Chemical Formula 1, $R_1$ to $R_6$ may be the same or different and may be selected from hydrogen, a halogen, a C1 to C10 alkyl group, a haloalkyl group, and a combination thereof.

Specific examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include an additive of vinylene carbonate, an ethylene carbonate-based compound represented by Chemical Formula 2, or propane sultone to improve a cycle life.

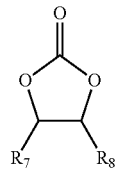

[Chemical Formula 2]

In Chemical Formula 2, $R_7$ and $R_8$ may be the same or different, and may be selected from hydrogen, a halogen, a cyano group (CN), a nitro group ($NO_2$), and a fluorinated C1 to C5 alkyl group, provided that at least one of $R_7$ and $R_8$ is selected from a halogen, a cyano group (CN), a nitro group ($NO_2$), and a fluorinated C1 to C5 alkyl group, wherein both of $R_7$ and $R_8$ are not hydrogen.

Examples of the ethylene carbonate-based compound may be difluoro ethylenecarbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the additive for improving cycle life may be flexibly used within an appropriate range.

The electrolyte may further include vinylethylene carbonate, propane sultone, succinonitrile, or a combination thereof. The use amount thereof may be adjusted within an appropriate range.

The lithium salt dissolved in an organic solvent supplies a battery with lithium ions, basically operates the rechargeable lithium battery, and improves transportation of the lithium ions between positive and negative electrodes. Examples of the lithium salt may include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers, for example integers of 1 to 20), LiCl, LiI, and $LiB(C_2O_4)_2$ (lithium bis(oxalato) borate; LiBOB). A concentration of the lithium salt may range from about 0.1 M to about 2.0 M. When the lithium salt is included at the above concentration range, an electrolyte may have excellent performance and lithium ion mobility due to optimal electrolyte conductivity and viscosity.

Of the lithium salts, $LiBF_4$ may be used as an additive. The use amount thereof may be adjusted within an appropriate range.

The rechargeable lithium battery may further include a separator between the negative electrode and the positive electrode, depending on a kind of the battery. Examples of a suitable separator material include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

Figure 3:
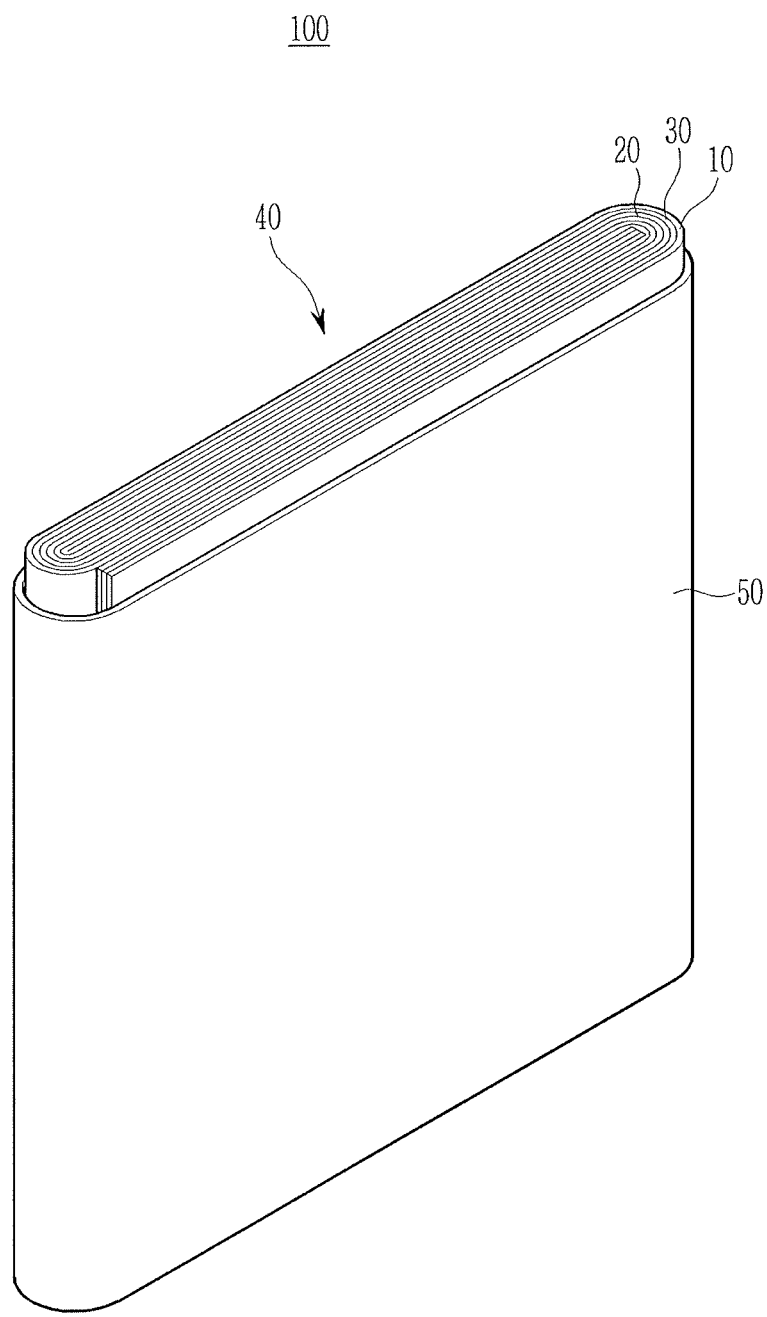
FIG. 3 illustrates a schematic view showing a structure of a rechargeable lithium battery according to an embodiment.

FIG. 3 illustrates an exploded perspective view of a rechargeable lithium battery according to an embodiment. The rechargeable lithium battery may include variously-shaped batteries such as a cylindrical battery, a pouch battery, or the like. For example, the rechargeable lithium battery may be a prismatic battery as illustrated in FIG. 3.

Referring to FIG. 3, a rechargeable lithium battery 100 according to an embodiment includes an electrode assembly 40 manufactured by winding a separator 30 interposed between a positive electrode 10 and a negative electrode 20, and a case 50 housing the electrode assembly 40. An electrolyte may be impregnated in the positive electrode 10, the negative electrode 20, and the separator 30.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Example 1

97 wt % of an artificial graphite negative active material, 1 wt % of a carboxymethyl cellulose (CMC) thickener, and 2 wt % of a styrene-butadiene rubber binder (SBR) were mixed in a deionized water solvent to prepare a negative active material slurry having a viscosity of 3000 cP.

The negative active material slurry was blade-coated onto a Cu foam current collector and compressed with a pressure of 250 kg/cm$^2$ to manufacture a negative electrode including a Cu foam current collector having a central region and a surface region, and an active mass charged in the central region and the surface region.

The central region corresponded to ±5% of upper and lower areas with a reference to a central thickness line of the negative electrode.

Regarding the cross section of the negative electrode, when a volume ratio of Cu and an active material in the central region of the Cu foam current collector was measured by mapping the active material and the metal with an SEM-EDX instrument, the result was 90:10 volume %, and when a volume ratio of Cu and an active material was measured in the surface region, the result was 10:90 volume %. In addition, in the surface region, the active material was present in the same concentration as in the central region.

Comparative Example 1

97 wt % of an artificial graphite negative active material, 1 wt % of a carboxymethyl cellulose thickener (CMC), and 2 wt % of a styrene-butadiene rubber binder (SBR) were mixed in a deionized water solvent to prepare a negative active material slurry having viscosity of 400 cP.

The negative active material slurry was used according to the same method as Example 1 to manufacture a negative electrode including a Cu foam current collector having a central region and a surface region and an active mass charged in the central region and the surface region.

In the electrode, when a volume ratio of Cu and an active material in the central region of the Cu foam current collector was measured according to the same method as Example 1, the result was 5:95 volume %, and when a volume ratio of Cu and an active material in the surface region was measured, the result was also 5:95 volume %.

Comparative Example 2

97 wt % of an artificial graphite negative active material, 1 wt % of a carboxymethyl cellulose thickener (CMC), and 2 wt % of a styrene-butadiene rubber binder (SBR) were mixed in a deionized water solvent to prepare a negative active material slurry having viscosity of 1000 cP, and the negative active material slurry was used according to the same method as Example 1 to manufacture a negative electrode including a Cu foam current collector having a central region and a surface region and an active mass charged in the central region and the surface region.

In the electrode, when a volume ratio of Cu and an active material was measured according to the same method as Example 1 in the central region of the Cu foam current collector, the result was 50:50 volume %, and when volume ratio of Cu and the active material in the surface region, the result was 50:50 volume %.

Charge and Discharge Characteristics of Battery Cell

Each negative electrode according to Example 1 and Comparative Examples 1 to 2, a lithium metal counter electrode, and an electrolyte solution were used to manufacture a half-cell. Herein, the electrolyte solution was prepared by dissolving 1.0 M LiPF$_6$ in a mixed non-aqueous organic solvent of ethylene carbonate (EC), propylene carbonate (PC), ethyl propionate (EP), and propyl propionate (PP) (EC/PC/EP/PP=20:10:40:30 in a volume ratio).

The half-cell was respectively once charged and discharged at 0.2 C, 1 C, 2 C, and 3 C, and its charge capacity was measured. The obtained charge capacity was used to calculate a capacity ratio based on charge capacity at 0.2 C, and the results are shown in FIG. 4.

Figure 4:
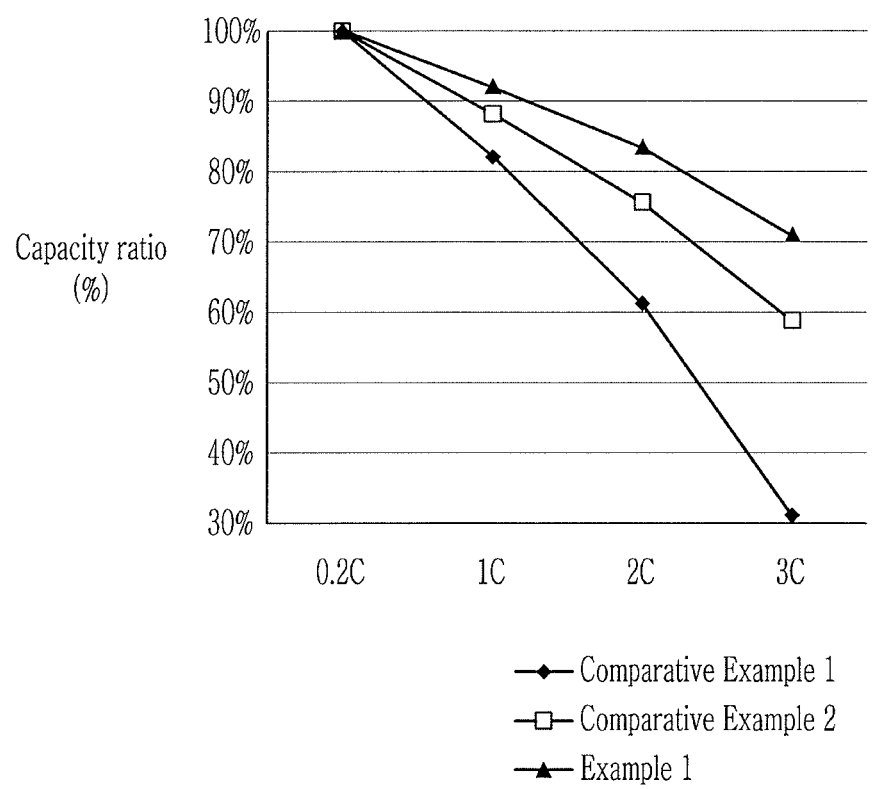
FIG. 4 illustrates a graph showing charge rate capabilities of half-cells including the positive electrodes according to Example 1 and Comparative Examples 1 to 2.

As shown in FIG. 4, the half-cell of Example 1 showed the most excellent charge capacity ratio compared with the half-cells according to the half-cells according to Comparative Examples 1 and 2.

By way of summation and review, as for a positive active material of a rechargeable lithium battery, a lithium-transition metal oxide having a structure capable of intercalating lithium ions such as LiCoO$_2$, LiMn$_2$O$_4$, LiNi$_{1-x}$Co$_x$O$_2$ (0<x<1), and the like have been used.

As for negative active materials, various carbon-based materials such as artificial graphite, natural graphite, hard carbon and the like have been used. Recently, a non-carbon-based negative active material based on silicon or tin has been researched in order to obtain more higher capacity.

Embodiments provide an electrode for a rechargeable lithium battery having improved safety and output characteristics.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. An electrode for a rechargeable lithium battery, the electrode comprising:
   a metal-containing foam current collector; and
   an active mass in the metal-containing foam current collector, the active mass including an active material,
   wherein:
   the electrode includes a central region and an outermost surface region, the central region corresponding to a ±5% upper and lower area with a reference to a central thickness line of the electrode, and the outermost surface region corresponding to a depth of 10% from an outermost surface of the metal-containing foam current collector in a direction toward the central region, the metal-containing foam current collector and the active material are each present in a volume ratio throughout each of the central region and the outermost surface region, the volume ratio being a ratio of a volume of metal in the metal-containing foam current collector to a volume of the active material, the active material is present with a concentration gradient such that a concentration increases from the central region to the outermost surface region, in the central region, the volume ratio is in a range of 90:10 to less than 100:greater than 0, and in the outermost surface region, the volume ratio is in a range of 10:90 to 1:99.

2. The electrode for a rechargeable lithium battery as claimed in claim 1, wherein the active material is present at a uniform concentration in the outermost surface region.

3. The electrode for a rechargeable lithium battery as claimed in claim 1, wherein the electrode further includes an active mass layer on the outermost surface region, the active mass layer including an active material.

4. The electrode for a rechargeable lithium battery as claimed in claim 1, wherein the metal-containing foam current collector is a Cu-containing foam current collector.

5. The electrode for a rechargeable lithium battery as claimed in claim 1, wherein the active material is a Si-based material, a Sn-based material, or a combination thereof.

6. A rechargeable lithium battery, comprising
a first electrode, wherein the first electrode is the electrode as claimed in claim 1;
a second electrode; and
an electrolyte.

7. The rechargeable lithium battery as claimed in claim 6, wherein the first electrode is a negative electrode and the second electrode is a positive electrode.

* * * * *